Nov. 4, 1941.　　　　A. R. PEREZ　　　　2,261,410
SOUND HEAD FOR MOTION PICTURE MACHINES
Filed Aug. 31, 1940
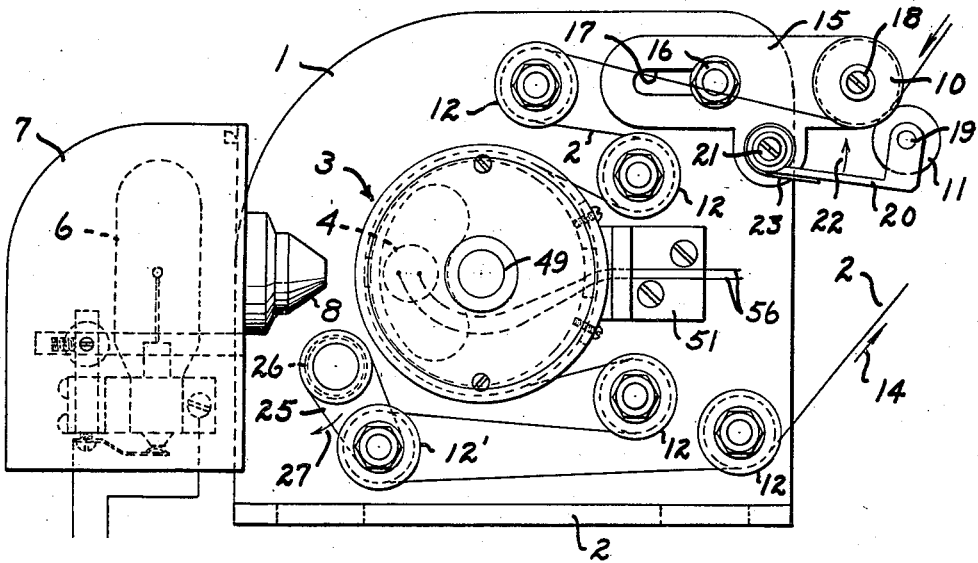
Fig. 1.
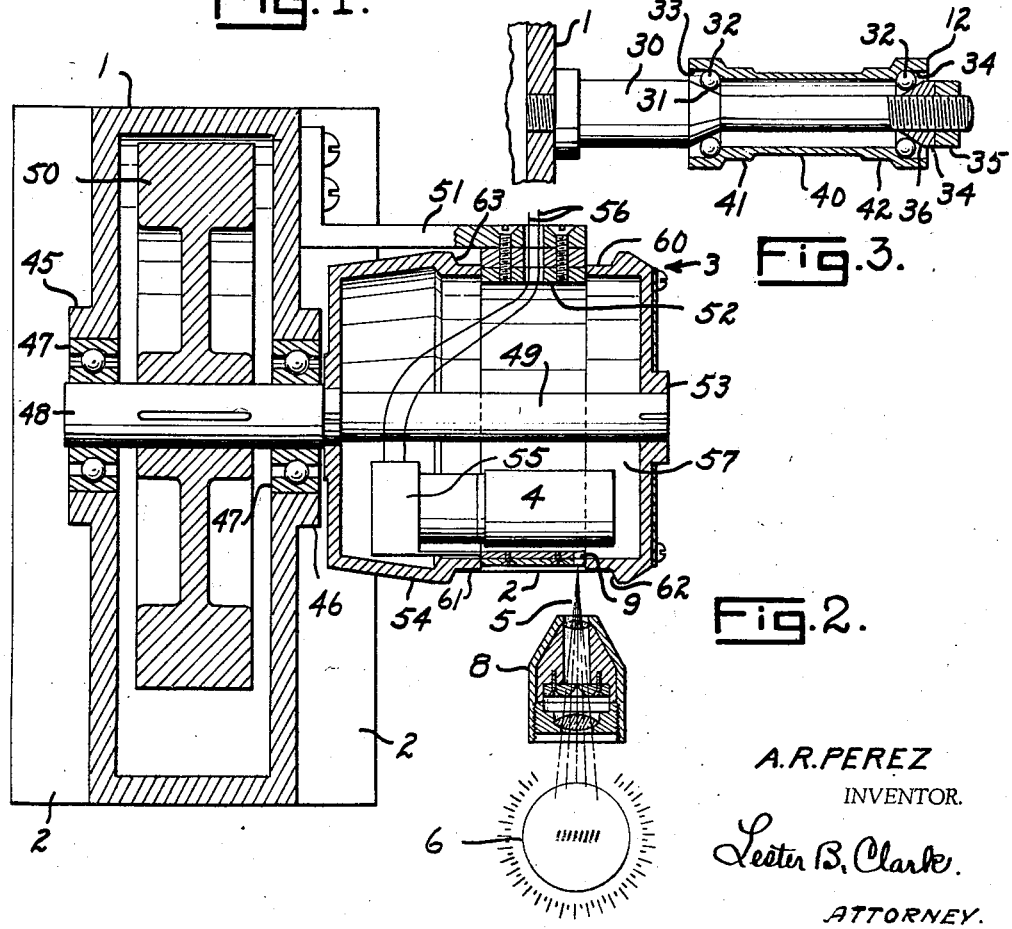
Fig. 3.
Fig. 2.
A. R. PEREZ
INVENTOR.
Lester B. Clark.
ATTORNEY.

Patented Nov. 4, 1941

2,261,410

UNITED STATES PATENT OFFICE 2,261,410

SOUND HEAD FOR MOTION PICTURE MACHINES

Antonio R. Perez, Monterrey, Mexico

Application August 31, 1940, Serial No. 354,960
In Mexico September 25, 1939

5 Claims. (Cl. 179—100.3)

This invention relates to improvements in sound recording and reproducing devices and more particularly to a device of a special utility when attached to moving picture machines for photoelectrically reproducing sound recorded on a sound track comprising a portion of the film used in such machines.

A primary object of the invention is to provide an improved device which is simple and inexpensive to construct, operate and maintain.

Another object is to provide a device of the class described which minimizes the abuse of the film which is passed therethrough.

Still another object is to provide a device which avoids undue stresses produced by speed variations, vibration and the positive drive of toothed gears engaging perforations in the edges of the sound carrying film.

Another object is to provide a device in which smooth operation is brought about by the use of antifriction bearings in the parts which carry the film past the photoelectric reproducing element.

A further object is to provide a specially constructed drum assembly for enclosing the photoelectric cell, such housing including spaced rotatable end members which accurately guide the record bearing film without making physical contact with the recordings thereon.

With the foregoing objects as primary objects the invention will become apparent, together with other objects, from the following detailed description of a preferred embodiment, such description being considered in connection with the accompanying drawing in which:

Fig. 1 is a side elevational view of a sound head comprising an illustrative embodiment of the invention and which may be utilized for either recording or reproduction of sound;

Fig. 2 is a sectional view through the drum assembly and illustrates the manner of directing the light beam upon a light responsive element within the assembly;

Fig. 3 is a sectional view through one of the rollers over which the film passes.

The embodiment of the invention illustrated in the drawing comprises a housing 1 having ears 2 thereon whereby the device may be readily attached to or detached from a camera or projector with which the device is used. The film or record strip 2 is carried over a plurality of rollers, to be more fully described and including a drum assembly generally referred to as 3 and serving as an enclosing chamber for a photoelectric cell 4 which is stimulated by a ray of light 5 from a light source 6 enclosed within a separate lamp housing 7 so that light emerging from the lens 8 is directed through an opening 9 in the drum assembly and enters the photoelectric cell 4 mounted therein.

The mechanism for movably supporting the film 2 during recording or reproduction includes coacting rollers 10 and 11 and a plurality of identical rollers 12 and 12' in addition to the drum assembly 3. A support 15 is attached to the housing 1 by means of a stud 16 passing through the slot 17 in the support whereby such support may be adjustably positioned upon the housing. The roller 10 is mounted upon the support 15 by means of a stub shaft 18. The roller 11 of resilient material is mounted on a shaft 19 fixed upon an arm 20 swingly positioned upon a pivot 21 and constantly urged in the direction indicated by the arrow 22 by means of a spiral spring 23. In this manner the roller 11 is constantly maintained in engagement with the film 2 entering the device and the friction of the rollers 10 and 11, which may be supplemented by any suitable braking mechanism, maintains the desired tension upon the film. Such tension minimizes vibration of the film and assists in stabilizing the movement of the film as well as bringing about desired and accurate guiding of the film as it passes through the device.

As already indicated the rollers 12 and 12' are of identical construction and the rollers 12 are directly mounted upon the housing 1 while the roller 12' is mounted upon an arm 25 pivoted on the housing 1 and constantly urged downwardly by means of enclosed spring 26 in the direction indicated by the arrow 27. As best seen in Fig. 3 each of the rollers 12 and 12' is mounted upon an axle 30 which is provided with a tapered surface 31 which serves as an inner ball race for the ball bearings 32 which also engage an outer raceway 33 within the roller 12. A similar bearing is provided at the opposite end of the roller 12 by means of a conical member 34 which is held in place by means of a nut 35 and is provided with a tapered surface 36 which, together with the outer raceway 34 in the roller and the balls 32 form an antifriction bearing at the outer end of the roller.

The peripheral surface of the rollers 12 and 12' is an important feature of the present invention and comprises a central cylindrical area 40 adjacent which are areas 41 and 42 of slightly larger diameter, it being intended that the areas 41 and 42 shall engage areas adjacent the edges of the film passing thereover so that contact with the film shall be made only with such edge areas and not with the recordings on the film which are utilized for the purpose of reproducing pictures or sounds. In this manner no contact or abrasive action with the recorded portions of the film will take place.

Referring to Fig. 2 it will be noted that the housing 1 is provided with spaced bosses 45 and 46 having antifriction bearings 47 therein to support a shaft 48 which extends outwardly from the housing at 49. A flywheel 50 is attached to the shaft 48 within the housing 1.

An arm 51 is attached to the exterior of the housing 1 and supports a cylindrical member 52 concentric with the outer end 49 of the shaft 48. A pair of cylindrical or cap members 53 and 54 are fixed upon the shaft 48 and have their inner edges closely juxtaposed to the edges of the member 52 thereby forming a chamber 57 within the drum assembly within which the light responsive element 4 is mounted upon a support member 55 attached to the member 52. A pair of wires 56 pass through alined openings in the member 52 and the arm 51, it being understood that such wires are connected to suitable apparatus for reproducing sound from the electrical vibrations impressed thereon.

The cylindrical members 53 and 54 have peripheral cylindrical surfaces 60 and 61 which are of slightly greater diameter than the member 52. Tapered annular surfaces 63 on the members merge with these cylindrical surfaces at their outer edges and are in such spaced relation that the film 2 is directed toward the center of the groove formed by these surfaces so that limited areas of the film adjacent the edges thereof will engage the surfaces 60 and 61 which are of such width that the image or sound track portions of the film are out of contact with the drum assembly.

The operation of the device constituting an illustrative embodiment of the invention is believed apparent from the foregoing description. By way of summary it may be noted that the film 2 after being passed over the rollers in the manner indicated in the drawing is drawn through the device in the direction indicated by the arrow 14. During the initial movement of the film through the assembly the arm 25 assists in limiting the stress placed upon the film as the drum assembly 3 together with the flywheel 50 are brought up to speed. Thereafter substantially constant stress will be maintained upon the film 2.

As already indicated the configuration of the respective rollers including the drum 23 is such as to accurately guide the film through the device whereby the sound track on the film will be directed past the opening 9 with a high degree of precision, a feature which is essential to satisfactory operation of the device. At the same time the film will contact the respective rollers as well as the cap members 53 and 54 of the drum assembly 3, only at and adjacent the edges thereof and in this manner actual contact and abrasive action with the recording area of the film will be avoided. Broadly the invention comprehends a new and improved sound head which is simple and inexpensive to construct, operate and maintain, which is efficient in operation and which minimizes the abuse to which the film is subjected.

What is claimed is:

1. In a sound head for traveling film the combination of, a housing, a drum assembly mounted on said housing, said assembly comprising a cylindrical stationary member having an opening to admit light to the interior of the assembly, a shaft rotatably mounted in said housing and extending coaxially through said member, a flywheel on the shaft, a pair of members mounted on said shaft to form with said cylindrical member an enclosed chamber for a light responsive cell adjacent said opening, the members of said pair being engageable with the edge portions of the traveling film to guide the sound portion thereof adjacent said opening, and means for conducting the film to and from said assembly.

2. In a sound head for traveling film the combination of, a housing, a cylindrical stationary member mounted thereon and having an opening to admit light to the interior thereof, a shaft, means mounted on said shaft and cooperating with said member and engageable with the edge portions of said film for supporting the film with the sound travel portion adjacent said opening, antifriction bearings mounting the shaft in said housing, and a flywheel mounted on said shaft whereby the rotation of said means is maintained uniform.

3. In a sound head for traveling film the combination of, a drum assembly comprising a stationary cylindrical member having an opening to admit light to the interior thereof, light responsive means mounted in said member, a pair of cylindrical members fixed upon said shaft and forming with said cylindrical member a closed chamber for the light responsive means, a shaft concentric with said members, each of said pair of members having cylindrical outer surfaces adjacent and of greater diameter than the outer surface of the stationary member, an annular tapered surface extending outwardly from each of said cylindrical surfaces, and means for conducting film to and from said assembly so that the film passes thereabout with the sound track portion adjacent said opening.

4. In a sound head for traveling film the combination of, a stationary cylindrical member having an opening to admit a beam of light to the interior thereof, light responsive means mounted in said member, a shaft, a pair of cylindrical members fixed upon said shaft at opposite sides of said member to form an enclosed chamber for said means, each of said pair of members having cylindrical outer surfaces adjacent and of greater diameter than the outer surface of said first mentioned member, and an annular tapered surface extending outwardly from each of said cylindrical surfaces for guiding the film so that the areas adjacent the edges of the film engage said pair of cylindrical members.

5. In a sound head for traveling film the combination of a stationary hollow member having an opening to admit a beam of light to the interior thereof, light responsive means mounted in said member, a shaft, cap members fixed upon said shaft and forming with said member an enclosure for said light responsive means, all of said members forming a drum for conducting the sound track area of a film adjacent said opening, said cap members having cylindrical outer surfaces adjacent and of greater diameter than the outer surface of the first mentioned member, and annular tapered surfaces on the cap members merging with said cylindrical outer surfaces, said tapered surfaces being spaced to accurately guide the film so that the areas adjacent the edges thereof engage the outer cylindrical surfaces of the cap members.

ANTONIO R. PEREZ.